(12) United States Patent
Trehan

(10) Patent No.: US 11,977,849 B2
(45) Date of Patent: May 7, 2024

(54) ARTIFICIAL INTELLIGENCE (AI) BASED AUTOMATED CONVERSATION ASSISTANCE SYSTEM AND METHOD THEREOF

(71) Applicant: Rajiv Trehan, Bangkok (TH)

(72) Inventor: Rajiv Trehan, Bangkok (TH)

(73) Assignee: Rajiv Trehan, Bangkok (TH)

( * ) Notice: Subject to any disclaimer, the term of this patent is extended or adjusted under 35 U.S.C. 154(b) by 443 days.

(21) Appl. No.: 17/239,838

(22) Filed: Apr. 26, 2021

(65) Prior Publication Data

US 2021/0334473 A1    Oct. 28, 2021

Related U.S. Application Data

(60) Provisional application No. 63/015,254, filed on Apr. 24, 2020.

(51) Int. Cl.
| | |
|---|---|
| *G06F 40/35* | (2020.01) |
| *G06F 40/289* | (2020.01) |
| *G06N 5/04* | (2023.01) |
| *G06N 20/00* | (2019.01) |
| *G10L 15/22* | (2006.01) |
| *H04L 51/02* | (2022.01) |

(52) U.S. Cl.
CPC ............ *G06F 40/35* (2020.01); *G06F 40/289* (2020.01); *G06N 5/04* (2013.01); *G06N 20/00* (2019.01); *G10L 15/22* (2013.01); *H04L 51/02* (2013.01)

(58) Field of Classification Search
CPC ............................. G10L 15/22; G06F 40/289
See application file for complete search history.

(56) References Cited

U.S. PATENT DOCUMENTS

| | | | |
|---|---|---|---|
| 2014/0214421 A1* | 7/2014 | Shriberg | G10L 25/87 704/243 |
| 2015/0179168 A1* | 6/2015 | Hakkani-Tur | G10L 15/22 704/257 |
| 2017/0092264 A1* | 3/2017 | Hakkani-Tur | G10L 15/16 |
| 2019/0027150 A1* | 1/2019 | Zhang | H04L 51/066 |
| 2019/0182335 A1* | 6/2019 | Chen | H04L 67/141 |
| 2021/0035573 A1* | 2/2021 | Abrahams | G06F 40/35 |

* cited by examiner

*Primary Examiner* — Douglas Godbold

(57) ABSTRACT

The disclosure relates to system and method for providing Artificial Intelligence (AI) based automated conversation assistance. The method includes analyzing, using a content analyzing model, at least one conversation stream captured during a real-time conversation between a plurality of users. The method includes identifying an assistance requirement of at least one first user of the at least one user and at least one primary context associated with the at least one conversation stream using the content analyzing model. Further, the method includes identifying at least one intelligent assistive model based on the identified assistance requirement using an AI model. Using the at least one intelligent assistive model, the method generates at least one assistive conversation stream. Contemporaneous to the at least one conversation stream being captured, the method renders the at least one assistive conversation stream to the at least one first user in real-time.

19 Claims, 9 Drawing Sheets

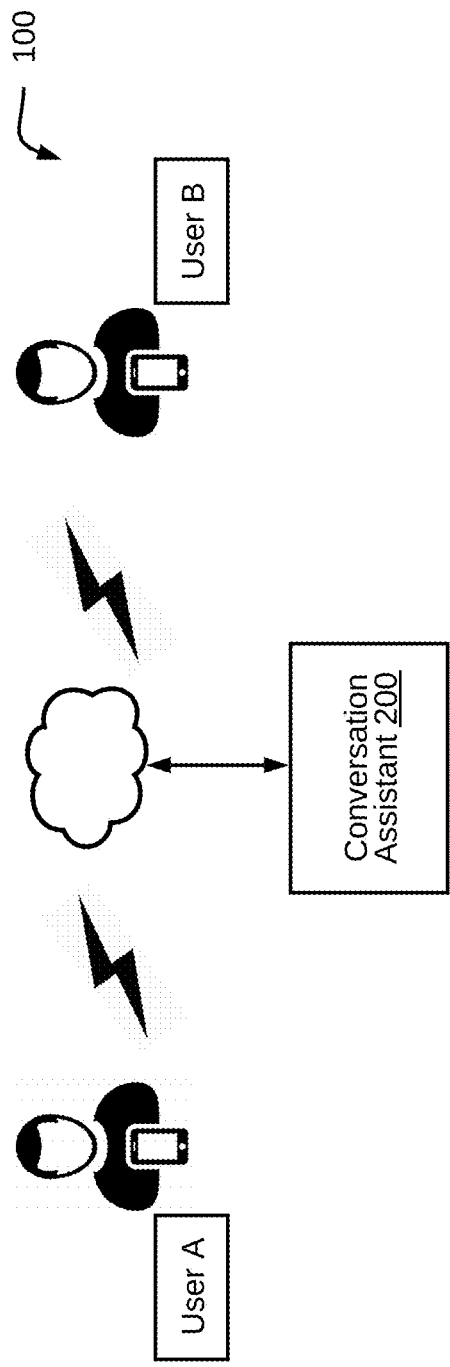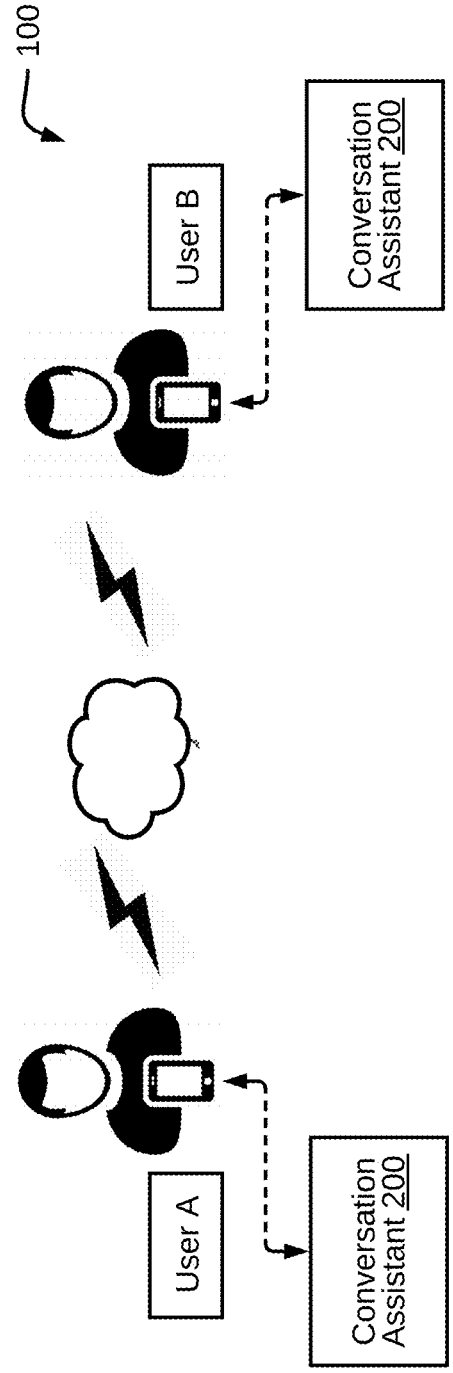

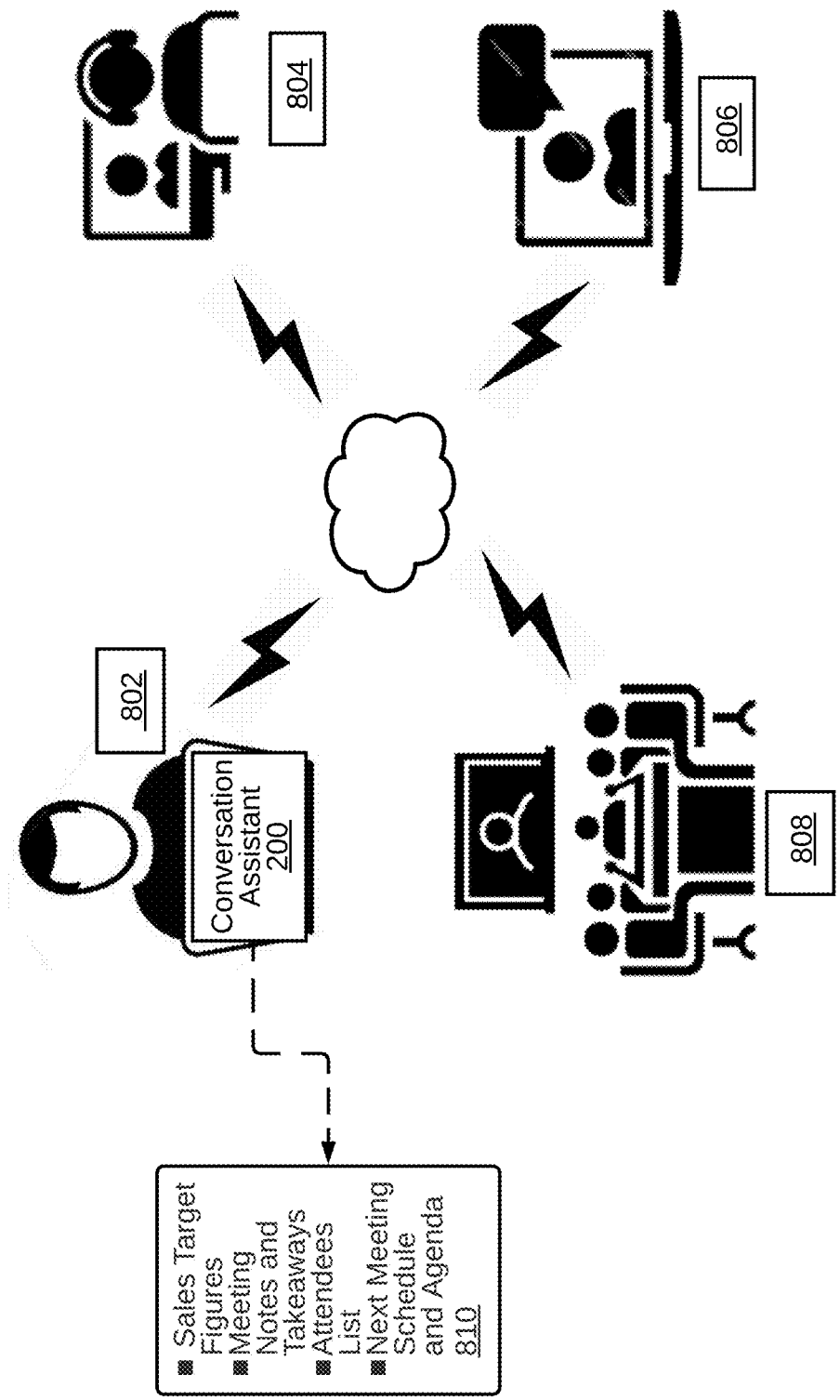

ARTIFICIAL INTELLIGENCE (AI) BASED AUTOMATED CONVERSATION ASSISTANCE SYSTEM AND METHOD THEREOF

CROSS-REFERENCE TO RELATED APPLICATION

This application claims priority benefits under 35 U.S.C. § 119(e) to U.S. Provisional Application No. 63/015,254 filed on Apr. 24, 2020, which is hereby incorporated by reference in its entirety.

TECHNICAL FIELD

This disclosure relates generally to system and method for providing conversation assistance, and more particularly to system and method for providing an Artificial Intelligence (AI) based automated conversation assistance.

BACKGROUND

A growing number of people these days are using smart devices, such as, smart phones, tablet computers, laptop computers, home assistance, and so on, to perform a variety of functionalities ranging from executing information search, playing music, controlling Internet Of Things (IoT) devices and services, scheduling appointments, and managing events to personal errands. In many instances, people interact with their devices or with services provided on a network through a virtual assistant. There are a host of things that virtual assistants can do for people, including: searching for information as requested, social media management, event management, managing calendars, appointments and emails, remotely controlling IoT devices, preparing reports, and so on.

Though, the virtual assistants act as an automated bridge between a person on one side and a service on the other side, while providing automated response and generating actions, the engagement of the virtual assistants during a real-time interpersonal conversation amongst the one or more people is limited. This is because the virtual assistants need to be activated every time before being used and are not perceptive enough and hence are not adept to interject a real-time conversation in order to provide assistance in normal pattern of speech or normal conversation based on pattern or style of speech of the persons participating in the real-time conversation.

Therefore, there is a need in the art for improved methods and systems for providing an Artificial Intelligence (AI) based automated conversation assistance service based on identifying potential assistance required by people involved in real-time conversation and context of the conversation for efficient control, and execution of a raised request or potential assistance to be provided.

SUMMARY

In an embodiment, a method for providing an Artificial Intelligence (AI) based automated conversation assistance is disclosed. In one example, the method may include analyzing, using a content analyzing model, content within at least one conversation stream captured during a real-time conversation between a plurality of users. The at least one conversation stream may be associated with at least one user from the plurality of users. Further, based on the analysis of the content within at least one conversation stream, an assistance requirement of at least one first user of the at least one user and at least one primary context associated with the at least one conversation stream may be identified using the content analyzing model. The method may use an AI model to identify at least one intelligent assistive model based on the identified assistance requirement. The at least one intelligent assistive model may be configured to provide assistance for the identified assistance requirement, and the at least one intelligent assistive model may be identified based on a confidence score determined for the at least one intelligent assistive model relative to the identified assistance requirement. Further, the method may use the at least one intelligent assistive model to generate at least one assistive conversation stream, based on one or more of: the identified assistance requirement, the identified at least one primary context, a user profile of each of the at least one user associated with the at least one conversation stream, and at least one secondary context. Contemporaneous to the at least one conversation stream being captured, the method may further render the at least one assistive conversation stream to the at least one first user in the real-time using the at least one intelligent assistive model.

In another embodiment, a system for providing AI based automated conversation assistance is disclosed. In one example, the system may include a processor, and a memory communicatively coupled to the processor. The memory comprises processor instruction, which when executed by the processor cause the processor to analyze, using a content analyzing model, content within at least one conversation stream captured during a real-time conversation between a plurality of users. The at least one conversation stream may be associated with at least one user from the plurality of users. The processor instructions, on execution, may further cause the processor to identify, using the content analyzing model, an assistance requirement of at least one first user of the at least one user and at least one primary context associated with the at least one conversation stream, based on the analysis of the at least one conversation stream. Further, the processor instructions, on execution, may identify, using an AI model, at least one intelligent assistive model based on the identified assistance requirement. The at least one intelligent assistive model may be configured to identify assistance requirement, and the at least one intelligent assistive model may be identified based on a confidence score determined for the at least one intelligent assistive model relative to the identified assistance requirement. The processor instructions, on execution, may generate, using the at least one intelligent assistive model, at least one assistive conversation stream, based on one or more of: the identified assistance requirement, the identified at least one primary context, a user profile of each of the at least one user associated with the at least one conversation stream, and at least one secondary context. Contemporaneous to the at least one conversation stream being captured, the processor instructions, on execution, may render in real-time using the at least one intelligent assistive model, the at least one assistive conversation stream to the at least one first user.

In another embodiment, a computer program product for AI based automated conversation assistance is disclosed. In one example, the computer program product is embodied in a non-transitory computer readable storage medium and comprises computer instructions for receiving, via a communication device, at least one verbal input from a user in a source language. The computer instructions may further include analyzing, using a content analyzing model, content within at least one conversation stream captured during a real-time conversation between a plurality of users. The at least one conversation stream may be associated with at least one user from the plurality of users. Further, based on the analysis of the content within at least one conversation stream, an assistance requirement of at least one first user of the at least one user and at least one primary context associated with the at least one conversation stream may be identified using the content analyzing model. The computer instructions may use an AI model to identify at least one intelligent assistive model based on the identified assistance requirement. The at least one intelligent assistive model may be configured to provide assistance for the identified assistance requirement, and the at least one intelligent assistive model may be identified based on a confidence score determined for the at least one intelligent assistive model relative to the identified assistance requirement. Further, the computer instructions may use the at least one intelligent assistive model to generate at least one assistive conversation stream, based on one or more of: the identified assistance requirement, the identified at least one primary context, a user profile of each of the at least one user associated with the at least one conversation stream, and at least one secondary context. Contemporaneous to the at least one conversation stream being captured, the computer instructions may further render the at least one assistive conversation stream to the at least one first user in real-time using the at least one intelligent assistive model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 1A-1D illustrate various exemplary systems implementing an Artificial Intelligence (AI) based automated conversation assistant, in accordance with some embodiments.

FIG. 8 illustrates generation of at least one assistive conversation stream by an AI based conversation assistant, in accordance with an exemplary embodiment.

DETAILED DESCRIPTION

Figure 1D:
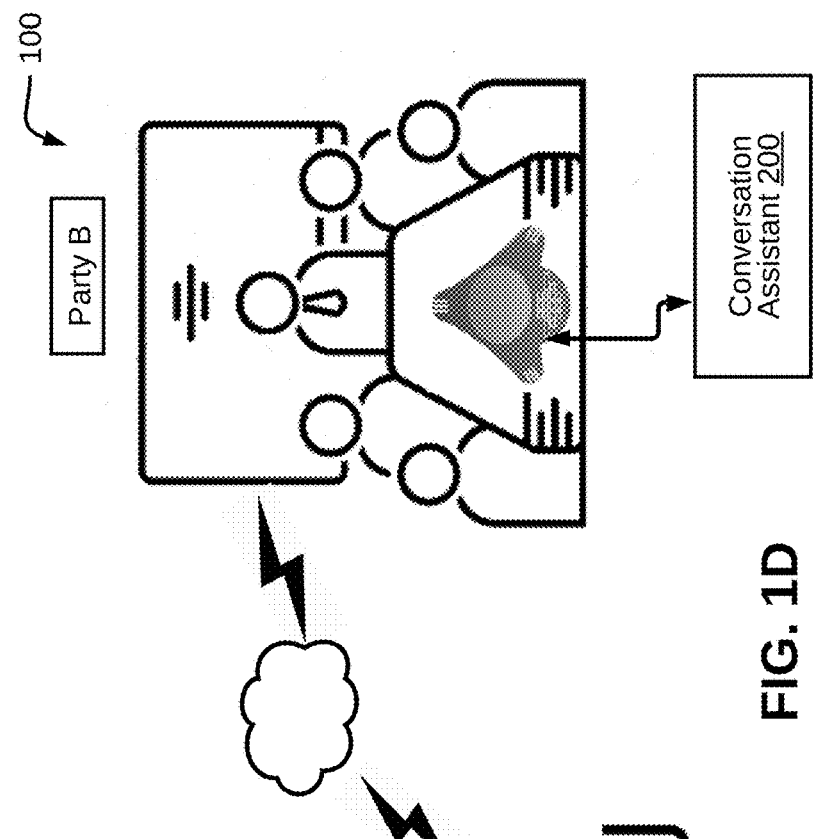

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Referring now to FIG. 1A, an exemplary system 100 implementing an Artificial Intelligence (AI) based automated conversation assistant 200 is illustrated, in accordance with some embodiments. By way of an example, a user A may be conversing with another user B in real-time through their computing devices (for example, a mobile phone, a laptop, a desktop, or a Personal Digital Assistants (PDA), and so forth) connected over a communication network (for example, a cellular network, internet, and the like). Conversation between the user A and the user B may be a verbal communication. Alternatively or additionally, the conversation may be a written communication, a visual communication, or a combination thereof. In this embodiment, the conversation assistant 200 may be communicatively coupled to the communication network and may provide AI based automated conversation assistance to one or more of the users A and B. The conversation assistant 200 may have an AI model installed therein. This is further explained in detail in subsequent paragraphs. The conversation assistant 200 may be a mobile phone, a laptop, a desktop, an application server, or a PDA. Alternatively, the conversation assistant 200 may be a software installed on a computing device or may be implemented as Software as a service (SaaS).

The conversation assistant 200 may capture at least one conversation stream during a real-time conversation occurring between the user A and the user B. A conversation stream may be a portion of the real-time conversation, which, for example, may be a sentence or multiple sentences. The conversation assistant 200 may include a content analyzing model to analyze the at least one conversation stream captured during the real-time conversation between the user A and the user B. The content analyzing model may be a Natural Language Processing (NLP) model, a Recurrent Neural Network (RNN) model, a Convolutional Neural Network (CNN), and the like.

In continuation of the above example, the conversation assistant 200 may use the content analyzing model to identify an assistance requirement of the user A and a primary context associated with the captured conversation stream. The assistance requirement may be identified based on utterance of one or more keywords or combination of such keywords by a user. The keywords may be determined based on various attributes associated with the user speech. These attributes may include, but are not limited to prolonged pauses, pitch, tone, rhythm, tempo, inflection, or diction. Additionally or alternatively, the assistance requirement may be identified based on an intent extracted from the captured conversation stream. Assistance requirement, for example, may include a user requirement of additional help, information, or assistance. It may be noted that assistance requirement may not correspond to a specific need or assistance that is actually required (or requested) by a user. However, the conversation assistant 200 may proactively identify these assistance requirements, even if a user does not require any assistance per se.

Further, the conversation assistant 200 may use an AI model to identify at least one intelligent assistive model based on the identified assistance required by the user A. It may be noted that there may be a plurality of intelligent assistive models that may be stored within the conversation assistant 200 and the at least one intelligent assistive model may be identified therefrom. In an embodiment, each of the plurality of intelligent assistive models may process the captured conversation stream to identify assistance requirement and to subsequently perform a self-identification or self-relevancy check. Each of the plurality of intelligent assistive models, for example, may be intelligent assistive cloud (for example, SaaS), an NLP model, intelligent assistive processes, intelligent assistive agents, intelligent assistive knowledge base, intelligent recommendation base, intelligent information repository, intelligent agent, or a targeted intelligent web crawler. The at least one intelligent assistive model may be configured or trained to provide assistance for the identified assistance requirement. In an embodiment, the at least one intelligent assistive model may be identified based on a confidence score determined for the at least one intelligent assistive model relative to the identified required assistance. In other words, multiple intelligent assistive models may be identified as relevant for the identified required assistance, however, only a few or a single intelligent assistive model may be able to provide relevant assistive information. Thus, confidence scores may be used to arrive at this selection of the at least one intelligent assistive model.

In addition to the at least one primary context, the content analyzing model may also identify at least one secondary context. While the at least one primary context may be strictly derived from the captured conversation stream, the at least one secondary context may be derived from additional resources which may be independent and/or adjacent to the captured conversation stream. By way of an example, the captured conversation stream may be about travel plans to a specific destination. Thus, a primary context derived from the captured conversation stream may be the name of the destination. Additionally, a secondary context derived may include weather information (for example, weather not being good etc.) associated with that destination, details about a potential flight delay to that destination from an origin location associated with a user. By way of another example, the at least one secondary context may correspond to analysis of ambient environment that the user is currently present in, time of the day, or day of the week. Example of ambient environment may include, but are not limited to time, location, lighting, background sound, camera angle, voice clarity, or image quality etc.

Based on one or more of the identified assistance required, the identified at least one primary context, a user profile of the user A, and the identified at least one secondary context, the conversation assistant 200 may use the at least one intelligent assistive model to generate at least one assistive conversation stream. The at least one assistive conversation stream, for example, may include feedback, summary, additional information, suggestions, comments, actions to be performed and so forth. Using the at least one intelligent assistive model, the generated at least one assistive conversation stream may be rendered in real-time, to at least the user A. The conversation assistant 200 may render the at least one assistive conversation stream by interjecting these during the real-time conversation between the users A and B. Based on whether the user A or the user B or both have availed services of the conversation assistant 200, one or more of the user A and the user B may be rendered the at least one assistive conversation stream.

By way of an example, the user A and the user B may be having a conversation about stock market and discussing whether to invest in a given stock or not. Contemporaneous to this discussion, whenever name of a company is mentioned either by the user A or the user B, the conversation assistant 200 may interject in the real-time conversation and may provide details related to the company as assistive conversation stream. Examples of the company details may include, but are not limited to PE ratio, current share price, profit earnings by the company in the last quarter, highest share price in the last 6 months, the lowest share price in the last 6 months, and the amount of dividend disbursed to shareholders.

Referring now to FIG. 1B, another exemplary system 100 implementing the AI based automated conversation assistant 200 is illustrated, in accordance with some embodiments. In this embodiment, a user A in possession of a computing device may converse in real-time with another user B in possession of another computing device. In this embodiment, the conversation assistant 200 may be installed on the computing device of each of the user A and the user B. The conversation assistant 200 may receive at least one conversation stream from at least one user (for example, either user A, either user B, or both the user A and the user B) during a real-time conversation between the user A and the user B.

The conversation assistant 200 may capture at least one conversation stream from the real-time communication occurring between the user A and the user B. Additionally, the conversation assistant 200 may analyze the captured at least one conversation stream using the content analyzing model. Further, the conversation assistant 200 may use the content analyzing model to identify an assistance requirement of one or both the user A and the user B, at least one primary context associated with the captured conversation stream, and at least one secondary context that may be related to but may be independent of or adjacent to the captured conversation stream.

Additionally, the conversation assistant 200 may use the AI model to identify at least one intelligent assistive model based on the identified assistance requirement. The at least one intelligent assistive model may be identified based on a confidence score determined for the at least one intelligent assistive model relative to the identified assistance requirement. Further, the at least one intelligent assistive model may be configured or trained to generate assistance conversation streams for the identified assistance requirement. The conversation assistant 200 may use the at least one intelligent assistive model to generate at least one assistive conversation stream based on one or more of: the identified assistance requirement, the identified at least one primary context, the identified at least one secondary context, and a user profile of the user A and the user B. The at least one assistive conversation stream may be rendered in real-time to the user A, or the user B or both the user A and B simultaneously.

Figure 1C:
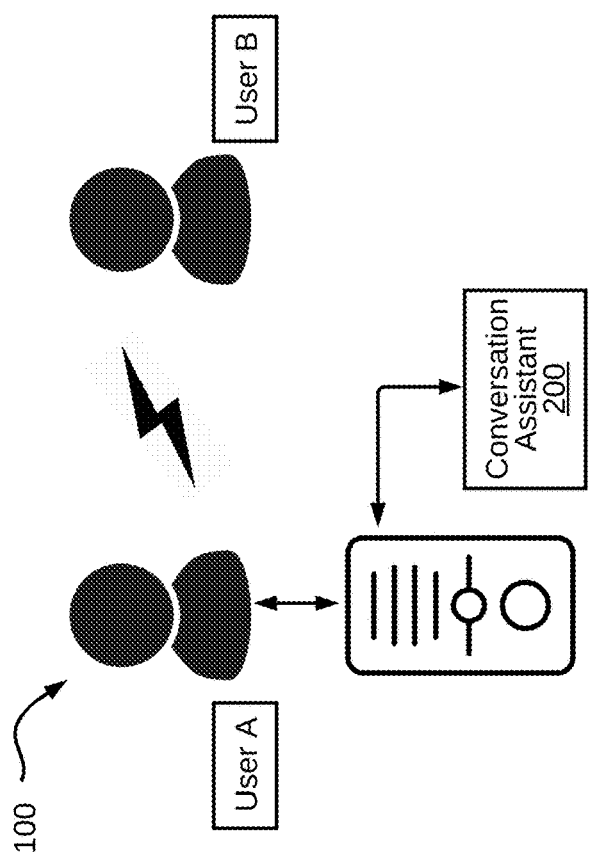

Referring now to FIG. 1C, yet another exemplary system 100 implementing the AI based automated conversation assistant 200 is illustrated, in accordance with some embodiments. In this embodiment, a user A may be present within a physical proximity of a user B, and the user A may be engaged in having a face-to-face verbal communication with the user B. The user A may be in possession of a device equipped with a microphone for capturing the real-time conversation occurring between the user A and the user B.

The conversation assistant 200 may be installed on the device for capturing at least one conversation stream from the real-time conversation. Further, the conversation assistant 200 may analyze the captured at least one conversation stream using the content analyzing model.

In continuation of the above example, the conversation assistant 200 may use the content analyzing model to identify an assistance requirement of the user A. Additionally, a primary context associated with the captured conversation stream from the real-time communication occurring between the user A and the user B may be identified. A secondary context may also be identified in addition to the primary context, which may be independent of or adjacent to the captured conversation stream and may be derived from additional (or secondary) data inputs. Further, the conversation assistant 200 may use the AI model to identify at least one intelligent assistive model based on the identified assistance requirement of the user A. The at least one intelligent assistive model may be identified based on a confidence score determined for the at least one intelligent assistive model relative to the identified assistance requirement. Additionally, the at least one intelligent assistive model may be configured and/or trained to provide assistance for the identified assistance requirement.

Based on one or more of: the identified assistance requirement, the identified primary and secondary context, and a profile of the user A and/or the user B, the conversation assistant 200 may use the at least one intelligent assistive model to generate at least one assistive conversation stream. Using the at least one intelligent assistive model, the generated at least one assistive conversation stream may be rendered in real-time to the user A.

By way of an example, the user A and the user B may be having a conversation about an upcoming technology, which the user B may be well versed with, while the user A may be a novice with regards to that technology. Thus, whenever the user B uses a technical term relevant to this technology area, the conversation assistant 200 may privately render to the user A, definition, details, recent application areas related to the technical term as assistive conversation stream. As a result, the user A without having prior knowledge about the technology being discussed may actively be able to participate in the discussion.

Referring now to FIG. 1D, yet another exemplary system 100 implementing the AI based automated conversation assistant 100 is illustrated, in accordance with some embodiments. In this embodiment, one or more users (for example, one or more participants, one or more parties (party A and party B), and the like) may participate in an online conference or a meeting and may communicate with other users in real-time using, for example, Voice over internet protocol (VoIP) conference calls. A VoIP dialer may be used by the users for participating in the VoIP conference calls. Further, a conversation assistant 200 may be installed on the VoIP dialer.

The conversation assistant 200 may capture at least one conversation stream from a real-time communication occurring between, for example, the party A and the party B. The conversation assistant 200 may analyze the captured at least one conversation stream using the content analyzing model. Additionally, the conversation assistant 200 may use the content analyzing model to identify an assistance requirement of either the party A and the party B, or both of the parties A and B. Further, a primary context associated with the at least one captured conversation stream may be identified, based on the analysis of the at least one conversation stream. Additionally, a secondary context may be identified in addition to the primary context, which may be independent of or adjacent to the captured conversation stream and may be derived from additional (or secondary) data inputs.

Further, the conversation assistant 200 may use the AI model to identify at least one intelligent assistive model based on the identified assistance requirement of either the party A and the party B, or both of the parties A and B. The at least one intelligent assistive model may be identified based on a confidence score determined for the at least one intelligent assistive model relative to the identified assistance requirement. Additionally, the at least one intelligent assistive model may be trained or configured for the identified assistance requirement.

Based on one or more of the identified assistance requirement, the identified primary and secondary context, and a profile of the either of the party A and the party B, or both of the parties A and B, the conversation assistant 200 may use the at least one intelligent assistive model to generate at least one assistive conversation stream. Using the at least one intelligent assistive model, the generated at least one assistive conversation stream may be rendered in real-time, to at least the party A, or the party B or both the parties A and B simultaneously.

As may be appreciated, the above-mentioned exemplary system implementation depicting conversation between users, may not be construed as limiting and the conversation may be performed amongst a plurality of users or amongst a plurality of parties in a specific time instance. Additionally, the conversation assistant 200 being installed on a computing device should not be considered as limiting and the conversation assistant 200 may be present on each of a device being possessed by a plurality of users participating in a real-time conversation.

Figure 2:
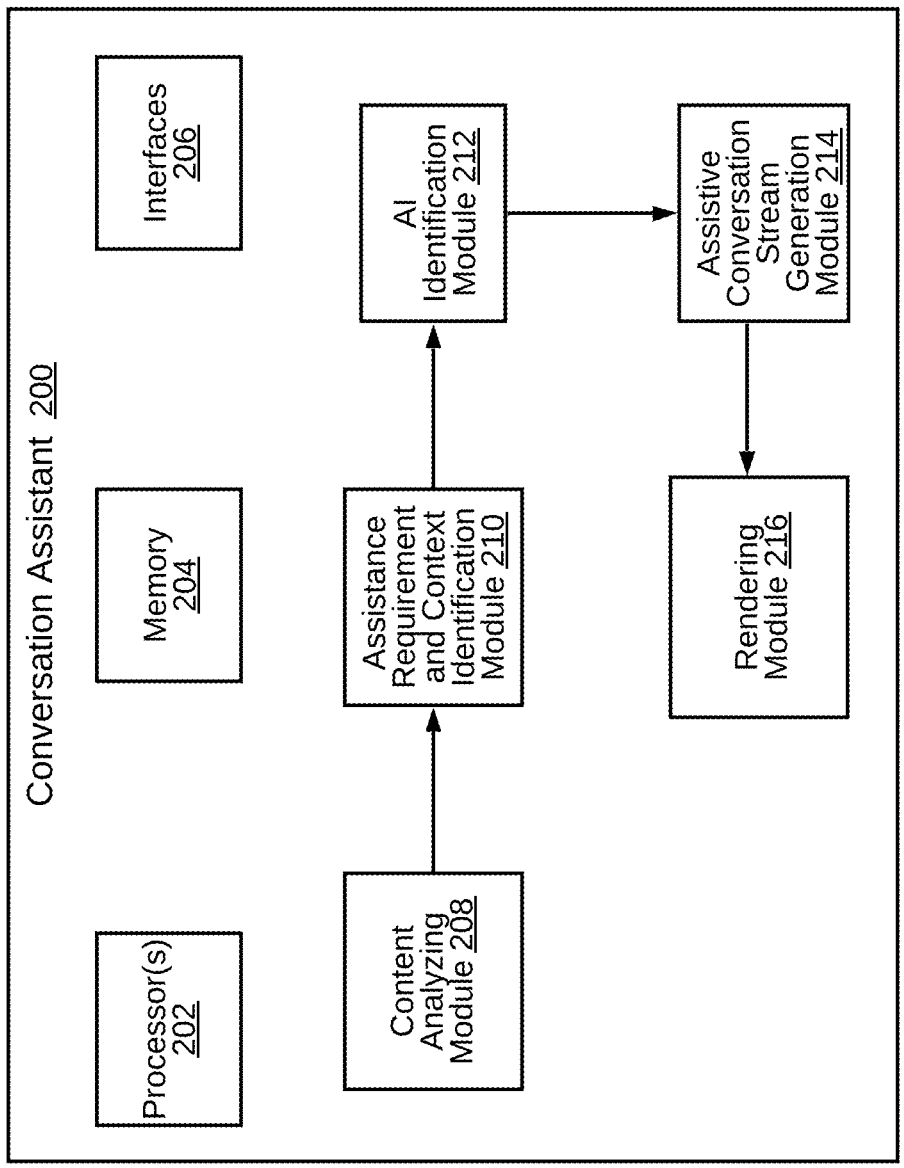
FIG. 2 illustrates a functional block diagram of a conversation assistant, implemented by the exemplary systems of FIGS. 1A-1D, in accordance with some embodiments.

Referring now to FIG. 2, a functional block diagram of the conversation assistant 200 is illustrated, in accordance with some embodiments. In an embodiment, the conversation assistant 200 may include one or more processors 202, a memory 204, and one or more interfaces 206. Additionally, the conversation assistant 200 may include a content analyzing module 208, an assistance requirement and context identification module 210, an AI identification module 212, an assistive conversation stream generation module 214, and a rendering module 216.

The one or more processors 202 may be implemented as one or more microprocessors, microcomputers, microcontrollers, digital signal processors, central processing units, logic circuitries, and/or any devices that manipulate data based on operational instructions. Among other capabilities, the one or more processors 202 may be configured to fetch and execute processor-executable instructions stored in the memory 204. The memory 204 may store one or more processor-executable instructions or routines, which may be fetched and executed for providing AI based automated conversation assistance. The memory 204 may include any non-transitory storage device including, for example, volatile memory such as RAM, or non-volatile memory such as EPROM, flash memory, and the like. The one or more interfaces 206 may include a variety of interfaces, for example, interfaces for data input and output devices, referred to as I/O devices, storage devices, and the like.

As may be appreciated, the conversation assistant 200 may be implemented as a combination of hardware and programming (for example, programmable instructions) to implement one or more functionalities. In examples described herein, such combinations of hardware and programming may be implemented in several different ways. For example, programming for the conversation assistant 200 may comprise processor executable instructions stored on a non-transitory machine-readable storage medium and the hardware for the conversation assistant 200 may comprise a processing resource (for example, one or more processors 202), to execute the instructions.

In an embodiment, the context analyzing module 208 may use a context analyzing model to analyze content within at least one conversation stream captured during a real-time conversation between a plurality of users. The at least one conversation stream may be associated with at least one user from the plurality of users. It will be apparent to a person skilled in the art that a plurality of conversation streams may be captured from the real-time conversation. The plurality of conversation streams may be captured based on a predefined criterion, that may include at least one of: expiry of a predefined time interval, utterance of one of a plurality of predefined keywords or phrase, a pause in the real-time conversation having a time duration greater than a predefined time limit, or identification of a partial intent from the real-time conversation. This is further explained in detail in conjunction with FIG. 4.

Further, the assistance requirement and context identification module 210, may use a context analyzing model to identity an assistance requirement of at least one first user of the at least one user and at least one primary context associated with the at least one conversation stream. The context analyzing model may further identify at least one secondary context. The at least one secondary context thus identified may be independent of or adjacent to the captured conversation stream and may be derived from additional (or secondary) data inputs. The assistance requirement and context identification module 210 may identify the assistance requirement and the primary context based on the analysis of the at least one conversation stream. The secondary context however may be related to the primary context but may be independent of or adjacent to the at least one conversation stream and may be derived from additional (or secondary) data inputs. The assistance requirement may be identified based on utterance of one or more keywords or combination of such keywords by the at least one first user. The keywords may be determined based on various attributes associated with the user speech. These attributes may include, but are not limited to prolonged pauses, pitch, tone, rhythm, tempo, inflection, or diction. Additionally or alternatively, the assistance requirement may be identified based on an intent captured from the captured at least one conversation stream. Assistance requirement, for example, may include a user requirement of additional help, information, or assistance. It may be noted that assistance requirement may not correspond to a specific need or assistance that is actually required by a user. However, the conversation assistant 200 may proactively identify these assistance requirements, even if a user does not require any assistance per se.

The AI identification module 212 may use an AI model to identify at least one intelligent assistive model based on the identified assistance requirement from a plurality of intelligent assistive models. Each of the plurality of intelligent assistive models, for example, may be intelligent assistive cloud (for example, SaaS), an NLP model, intelligent assistive processes, intelligent assistive agents, intelligent assistive knowledge base, intelligent recommendation base, intelligent information repository, intelligent agent, or a targeted intelligent web crawler. The at least one intelligent assistive model may be configured or trained to generate assistive conversation streams for the identified assistance requirement. Further, the at least one intelligent assistive model may be identified based on a confidence score determined for each of the at least one intelligent assistive model relative to the identified assistance requirement.

In an embodiment, the identification of the at least one intelligent assistive model may include using the AI model to categorize the identified assistance requirement into at least one predefined category from a plurality of predefined categories. The categorization may be performed by comparing the identified assistance requirement with a plurality of assistance requirements and the identified context (primary and/or secondary) with a plurality of predetermined contexts. Further, the categorization includes using the AI model to assign a sub-category to the identified assistance requirement at each of a plurality of structured category levels associated with the at least one predefined category. In an embodiment, the plurality of structured category levels may be hierarchical. The categorization may be performed by comparing the identified context (primary and/or secondary) with the plurality of predetermined contexts. Additionally, the sub-category assigned at each of the plurality of structured category levels may be associated with one of the plurality of predetermined contexts. Further, a leaf category level from the plurality of structured category levels may be identified based on the assigned sub-category at each of the plurality of structured category levels. The at least one intelligent assistive model may be associated with the leaf category level thus identified. In other words, in order to identify the at least one intelligent assistive model, the leaf category level may have to be identified first. In a similar manner, each of a plurality of leaf category levels associated with each of the plurality of predefined categories may be mapped to at least one intelligent assistive model. In an alternate embodiment, each category level may be mapped to at least one intelligent assistive model. Thus, in this case, traversal to the leaf category level may not be required to identify the at least one intelligent assistive model.

In another embodiment, the AI model may directly identify the at least one intelligent assistive model without mapping the identified assistance requirement to at least one predefined category from the plurality of predefined categories and the identified context (primary and/or secondary) to the plurality of predetermined context. To this end, a training data set may be created to train the AI model for identifying one or more intelligent assistive models based on a plurality of assistance requirements. Further, the training dataset may be used to train the AI model to identify the at least one intelligent assistive model based on the identified assistance requirement.

Thereafter, the assistive conversation stream generation module 214 may use the at least one intelligent assistive model (whether identified via mapping with the leaf category level or directly by the AI model) to generate at least one assistive conversation stream. The at least one assistive conversation stream may be generated based on one or more of the identified assistance requirement, the identified primary context, the identified secondary context, and a user profile of each of the at least one user associated with the at least one conversation stream.

Generation of the at least one assistive conversation stream may further include modifying the at least one assistive conversation stream for each of the at least one user. The modification may be performed based on the user profile associated with each of the at least one user to generate at least one modified assistive conversation stream. In an embodiment, at least one assistive conversation template may be associated with the leaf category level. In this case, once the leaf category level from the plurality of structured category levels is identified, the at least one assistive conversation template associated with the leaf category level may be extracted. The extracted at least one assistive conversation template may then be populated based on the identified primary context, the identified secondary context, and the user profile of each of the at least one user, to generate the at least one assistive conversation stream.

Further, the rendering module 216 may render the at least one assistive conversation stream to the at least one first user in real-time using the intelligent assistive model. It may be noted that the at least one assistive conversation stream may be rendered to the at least one first user contemporaneous to capturing the at least on conversation stream. The rendering may include presenting each of the at least one modified assistive conversation stream to an associated user from the at least one user. In an embodiment, the generated at least one assistive conversation stream may be rendered privately to the at least one first user. Additionally, the real-time conversation may be interjected with rendering of the at least one assistive conversation streams.

The rendering module 216 may be implemented as assistive agents, for example, as a male voice or a female voice. A user may be provided with an option to select a way by which the at least one assistive conversation stream may be rendered during a real-time conversation.

It should be noted that all such aforementioned modules 208-216 may be represented as a single module or a combination of different modules. Further, as will be appreciated by those skilled in the art, each of the modules 208-216 may reside, in whole or in parts, on one device or multiple devices in communication with each other. In some embodiments, each of the modules 208-216 may be implemented as dedicated hardware circuit comprising custom application-specific integrated circuit (ASIC) or gate arrays, off-the-shelf semiconductors such as logic chips, transistors, or other discrete components. Each of the modules 208-216 may also be implemented in a programmable hardware device such as a field programmable gate array (FPGA), programmable array logic, programmable logic device, and so forth. Alternatively, each of the modules 208-216 may be implemented in software for execution by various types of processors (e.g., processor(s) 202). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying common requirements from applications. For example, the exemplary conversation assistant 200 may identify common requirements from applications by the processes discussed herein. In particular, as will be appreciated by those of ordinary skill in the art, control logic and/or automated routines for performing the techniques and steps described herein may be implemented by the conversation assistant 200 either by hardware, software, or combinations of hardware and software. For example, suitable code may be accessed and executed by the one or more processors on the conversation assistant 200 to perform some or all of the techniques described herein. Similarly, ASICs configured to perform some or all of the processes described herein may be included in the one or more processors on the conversation assistant 200.

Figure 3:
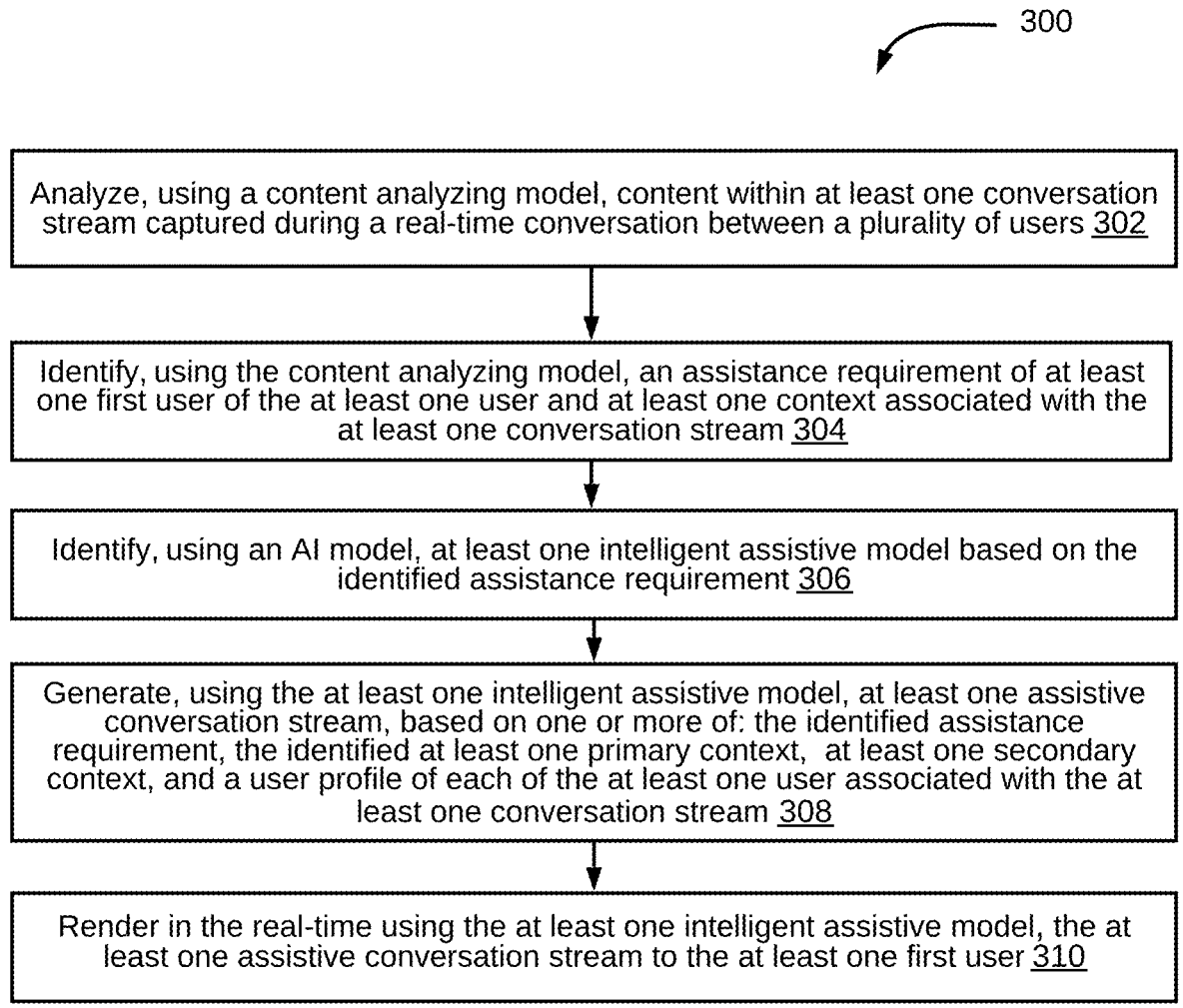
FIG. 3 illustrates an exemplary process for providing AI based automated conversation assistance, in accordance with some embodiments.

Referring now to FIG. 3, an exemplary process 300 for providing AI based automated conversation assistance is depicted via a flowchart, in accordance with some embodiments. The process 300 includes analyzing, using a content analyzing model, at least one conversation stream captured during a real-time conversation between a plurality of users, at step 302. The at least one conversation stream may be associated with at least one user from the plurality of users. As may be appreciated, the conversation stream may be captured, during the real-time conversation, via a communication device equipped with the conversation assistant 200. The communication device may be a mobile device, such as, but not limited to a mobile phone, a tablet, a smartwatch, a laptop, or the like. Further, the user may be any person or speaker taking part temporarily or throughout in the real-time call, conversation, meeting, or conference session as defined herein.

Further, based on the analysis of the at least one analyzed conversation stream, the process 300 may use the content analyzing model to identify an assistance requirement of at least one first user of the at least one user at step 304. The assistance requirement may be identified based on utterance of one or more keywords or combination of such keywords by the at least one first user. The keywords may be determined based on various attributes associated with the user speech. These attributes may include, but are not limited to prolonged pauses, pitch, tone, rhythm, tempo, inflection, or diction. Additionally or alternatively, the assistance requirement may be identified based on an intent captured from the captured at least one conversation stream. Assistance requirement, for example, may include a user requirement of additional help, information, or assistance. It may be noted that assistance requirement may not correspond to a specific need or assistance that is actually required by a user. However, the conversation assistant 200 may proactively identify these assistance requirements, even if a user does not require any assistance per se.

Additionally, the process 300 may use the content analyzing model to identify at least one primary context associated with the at least one conversation stream at step 304. Additionally, at least one secondary context may also be identified at step 304, which may be independent of or adjacent to the captured conversation stream and may be derived from additional (or secondary) data inputs. The conversation assistant 200 may use the content analyzing model to process or understand assistance requirement of the users involved in the real-time conversation to perform tasks like answering questions, providing additional (unrequested) information, or summarizing conversations etc. The conversation assistant 200 may analyze the captured at least one conversation stream with a purpose of identifying keywords and may facilitate to build a conversation flow using the content analyzing model.

Further, the at least one primary context identified from the at least one analyzed conversation stream may be determined based on one or more of location, time, subject, or topic being discussed in the analyzed conversation stream. As discussed before, the assistance requirements may be determined to identify requirements, objectives, purpose, goals etc. of the users involved in the real-time communication. Additionally, the determined assistance requirements, for example, may include, but are not limited to need for additional information, a purchase intent, a question, a request statement, and the like.

The process 300 may use an AI model to identify at least one intelligent assistive model based on the identified assistance requirement, at step 306. The at least one intelligent assistive model may be configured or trained to provide assistance for the identified assistance requirement. Further, the at least one intelligent assistive model may be identified based on a confidence score determined for the at least one intelligent assistive model relative to the identified assistance requirement. In an embodiment, the AI model, for example, may be machine learning algorithms that may be trained using data and human expert inputs to replicate decisions that an expert may make when provided with similar information. Further, the assistance requirement may be identified using an assistance requirement classifier which may be configured to provide an output that indicates likelihoods or confidences regarding pluralities of different interests being determined based on topics or subjects being discussed. In some implementations, only those assistance requirements having likelihoods or confidences to satisfy one or more thresholds may be identified as assistance requirements.

At step 308, based on one or more of the identified assistance requirement, the identified at least one primary context, the identified at least one secondary context, and a user profile of each of the at least one user associated with the at least one conversation stream, at least one assistive conversation stream may be generated using the at least one intelligent assistive model. The user profile, for example, may be determined from documents or information related, but not limited to text messages, social media posts, friend network, professional background, interests, education, etc. associated with the user. In an embodiment, the plurality of users sharing a particular interest may be encouraged to participate in an online meeting or the real-time conversation.

Contemporaneous to at least one conversation stream being captured, using the at least one intelligent assistive model, the process 300 at step 310 may render the at least one assistive conversation stream to the at least one first user in real-time. In other words, the at least one assistive conversation stream may be rendered almost at the same time instant when the at least one conversation stream is captured. The at least one assistive conversation stream may include, but is not limited to text messages or audio messages including audio noises such as clapping or laughing and may be provided through an audio channel of a computing device of the user. Additionally, the at least one assistive conversation stream may include, but is not limited to a presentation, voice or text-based commentary in form of advice, information, anecdotes, feedback, jokes, historical context, antagonist comments, vocabulary, translations, strategy suggestions, and the like. By way of an example, the commentary may be provided to a listener of a voice-based channel, for example while listening to news broadcast, sport event, movies or shows. In an embodiment, the commentary may be provided privately to only one of the users or may be broadcasted to the plurality of users. Further, the plurality of users in the conversation may receive different contents in the commentary. In addition, sub-groups of the plurality of users involved within the conversation may receive collective commentary having similar or different contents. Also, the commentary may be built into a conference, a telephonic call, a chat or other similar communication-based mediums.

In an embodiment, the at least one assistive conversation stream provided to the participant may also be considered and used as signals or directions for conducting other subsequent activities, such as, generating alternative queries, providing additional suggestions to the user when the user participates in the real-time conversation. For example, upon determining that the user desires to book an appointment with a doctor located within his proximal location, the user may be provided with suggestions related to doctor's availability, timings, doctor's experience, field of practice, and may be further presented with an option of whether the appointment is required to be booked, and so forth.

Figure 4:
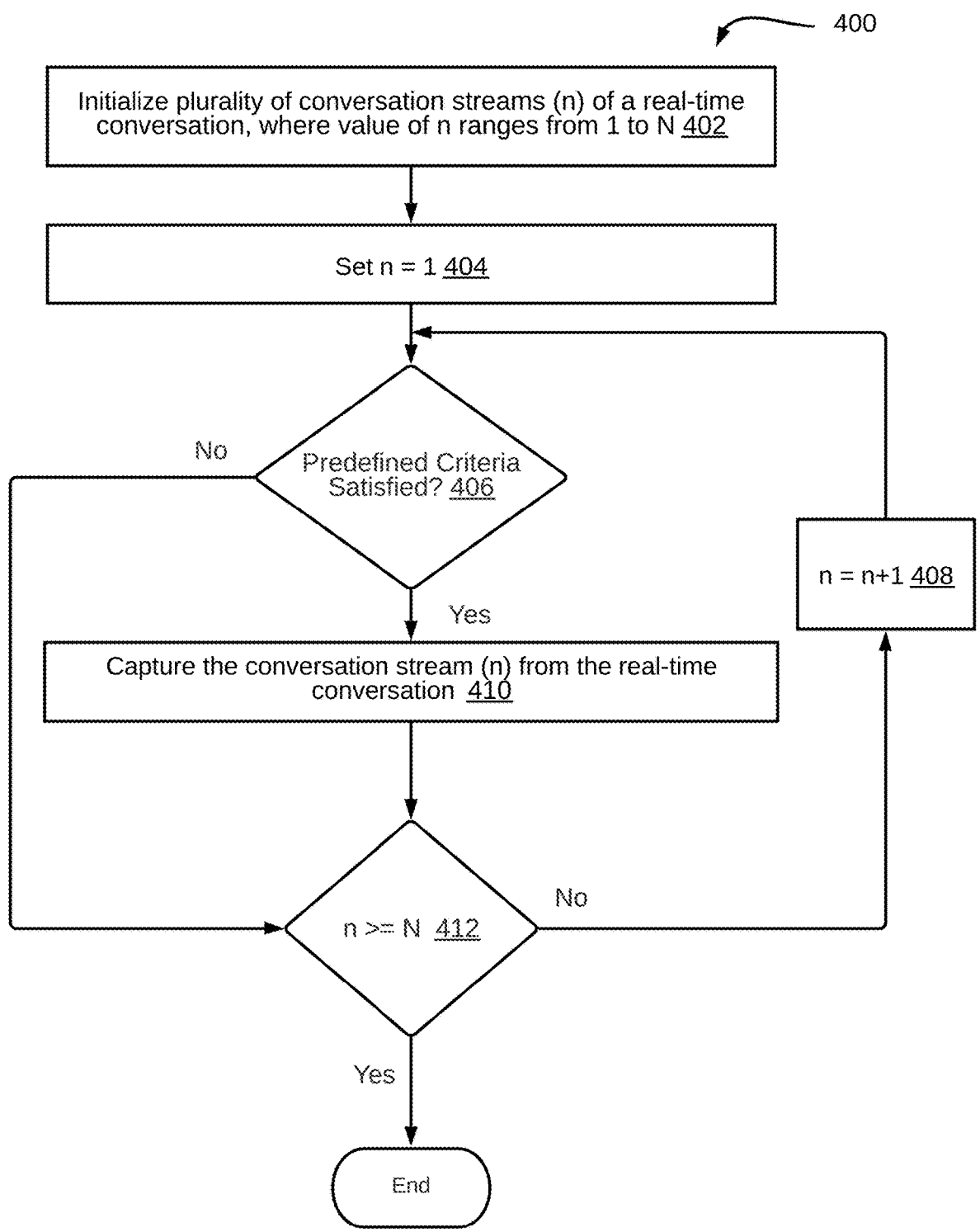
FIG. 4 illustrates an exemplary process for capturing a plurality of conversation streams from a real-time conversation based on a predefined criterion, in accordance with some embodiments.

Referring now to FIG. 4, an exemplary process 400 for capturing a plurality of conversation streams from a real-time conversation based on a predefined criterion is depicted via a flowchart, in accordance with some embodiments. The predefined criterion may include, but is not limited to expiry of a predefined time interval, utterance of one of a plurality of predefined keywords or phrases, a pause in the real-time conversation having a time duration greater than a predefined time limit, and identification of a partial intent from the real-time conversation.

The process 400 includes initializing the plurality of conversation streams of a real-time conversation as 'n' at step 402. Further, the range of values for n may be set from '1' to 'N,' where in N is the maximum number of conversation streams in the real-time conversation. At step 404, the value of 'n' initially may be set as '1'. Further, a check may be performed at step 406 to determine whether the predefined criterion is satisfied or not. Upon the predefined criterion being satisfied, a conversation stream (n) may be captured from the real-time conversation, at step 410. Upon the predefined criteria not being satisfied, a determination is made whether the current value of 'n' is equal to or greater than the value of 'N', at step 412. If the determination, at step 412 is negative, value of 'n' may be incremented by a unit, at step 408. Thereafter, the control moves back to step 406. Thus, the process 400 may executed until the incremented value of 'n' is equal to or greater than the value of 'N'. Further, if the determination at step 412 is positive, it may be considered that all the conversation streams present within the real-time conversation have been analyzed and the process 400 may be halted.

Figure 5:
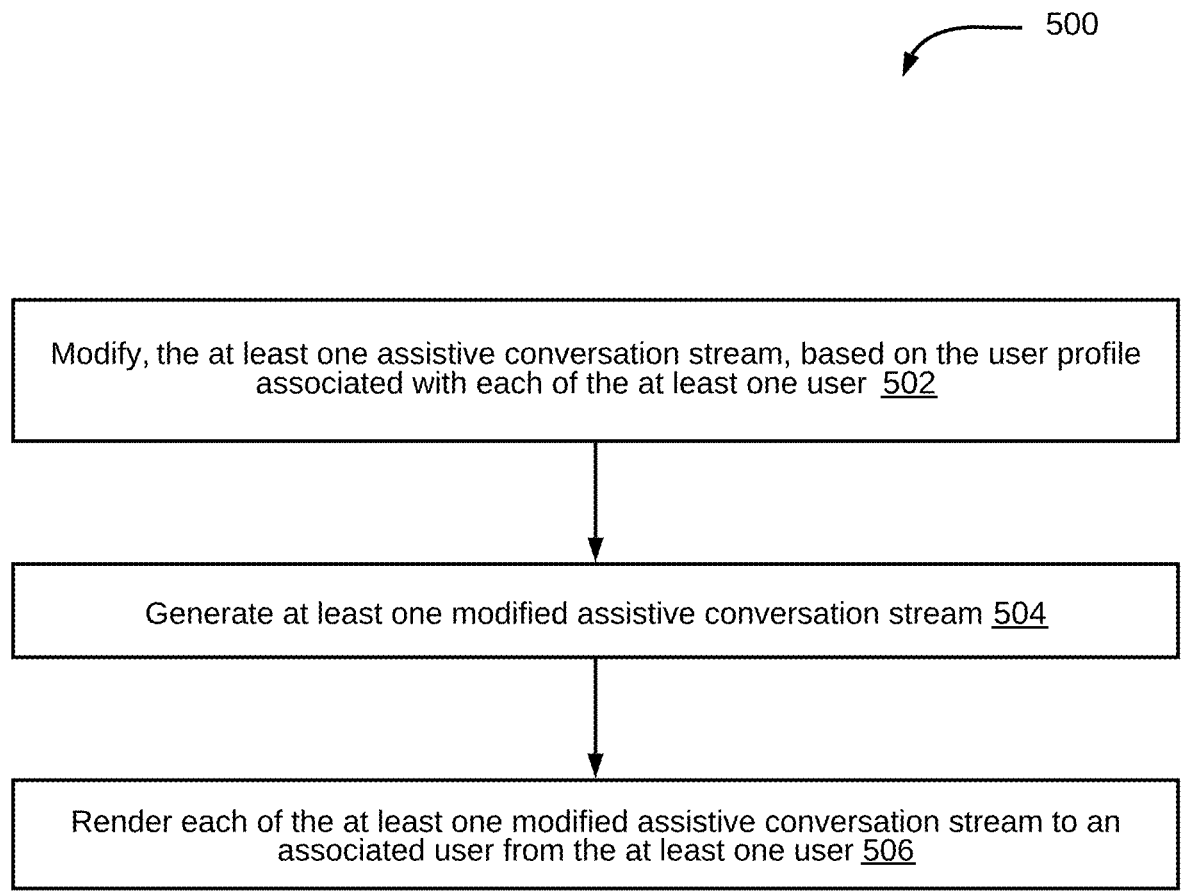
FIG. 5 illustrates an exemplary process for generating assistive conversation streams for different users, in accordance with some embodiments.

Referring now to FIG. 5, an exemplary process 500 for generating assistive conversation streams for different users is depicted via a flowchart, in accordance with some embodiments. The assistive conversation streams may be generated based on at least one conversation stream captured from a real-time conversation between the at least one user. This has already been explained in detail in conjunction with FIG. 4. The process 500 includes modifying at least one assistive conversation stream based on the user profile associated with each of the at least one user, at step 502. Further, the process 500 may include generating, at step 504, at least one modified assistive conversation stream in response to the modifying. Additionally, the process 500 may include rendering each of the at least one modified assistive conversation stream to an associated user from the at least one user, at step 506.

As may be appreciated, an assistive conversation stream may be related to a feedback or a comment that may be provided to the at least one user, participating in the real-time conversation, based on the user profile. By way of an example, two uses say 'Jim' and 'John' are involved in a real-time conversation through their computing devices connected over a network. Assuming that the computing device being used by 'Jim' has the conversation assistant 200 that is analyzing conversation streams captured from the real-time conversation. In the real-time conversation, Jim may propose John to watch a movie together in a theatre tonight. In such case, the conversation assistant 200 may identify an assistance requirement of Jim as 'watch a movie together' and the primary context of the conversation may be determined from the captured keyword such as 'movie,' 'tonight,' and 'cinema hall.' Upon identifying an acceptance from John, the conversation assistant 200, based on profile information of Jim, may provide (verbal or textual) suggestions or comments related, but not limited to movies of Jim's preference and interests, last movies watched by Jim, Jim's language preference, Jim's preference for specific actors, or the like. In addition to the movie suggestions, the conversation assistant 200 may also provide a list of theaters located near-by, current movies being played, show timings of movies, availability of tickets, and other similar information. In an embodiment, these suggestions or comments determined based on Jim's profile may be provided to both Jim and John. In another embodiment, these suggestions or comments determined based on Jim's profile may only be provided to Jim. In a similar manner, suggestions or comments determined based on John's profile may only be provided to John.

Figure 6:
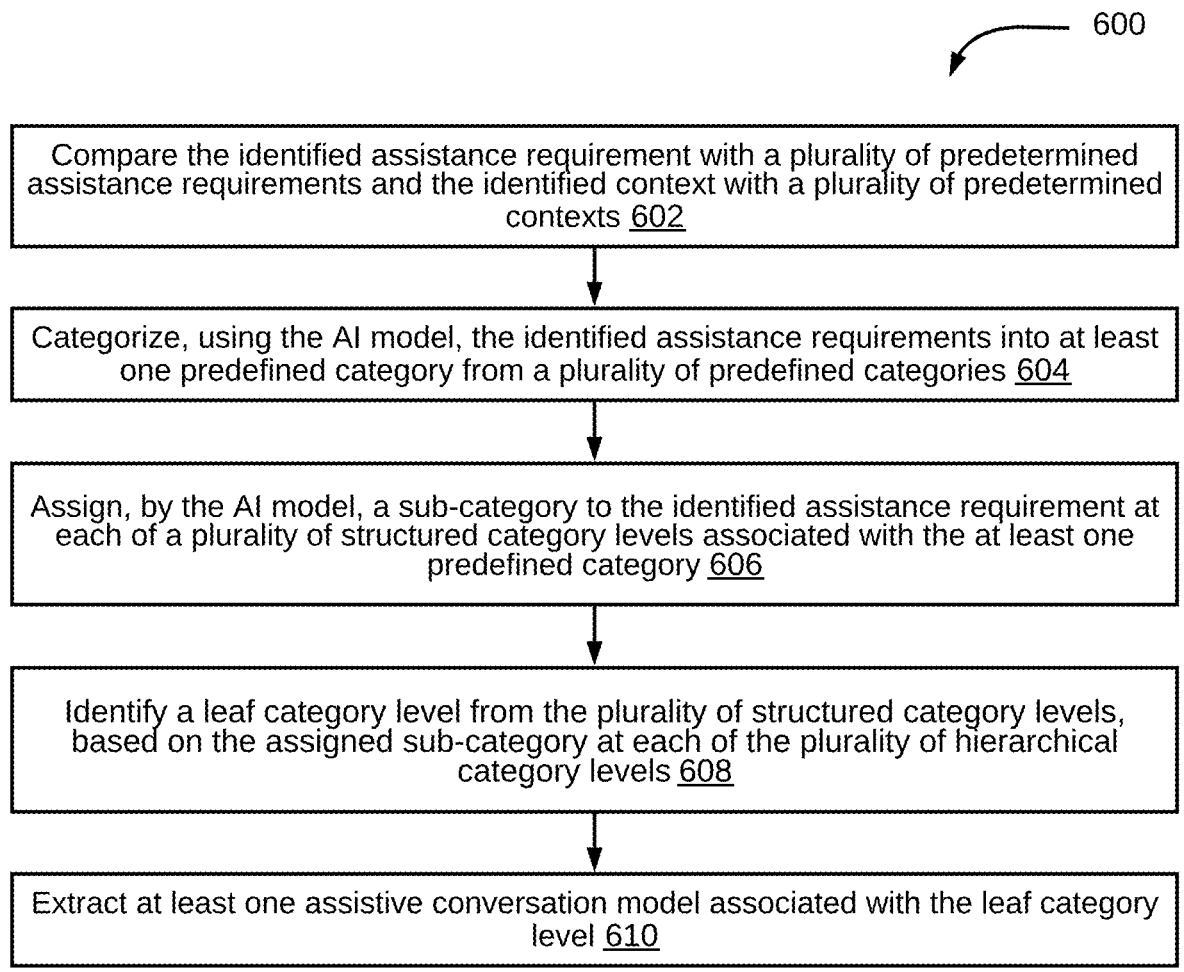
FIG. 6 illustrates an exemplary process for identifying at least one intelligent assistive model to generate at least one assistive conversation stream, in accordance with some embodiments.

Referring now to FIG. 6, an exemplary process 600 for identifying at least one intelligent assistive model to generate at least one assistive conversation stream is depicted via a flowchart, in accordance with some embodiments. The process 600 includes comparing the identified assistance requirement with a plurality of predetermined assistance requirements and the identified context (primary and/or secondary) with a plurality of predetermined contexts, at step 602. Based on the comparison, and using the AI model, the identified assistance requirement may be categorized into at least one predefined category from a plurality of predefined categories, at step 604. It may be noted that each of the plurality of predefined categories is mapped to at least one of the predetermined assistance requirement from the plurality of predetermined assistance requirements. The categorization may be performed by comparing the identified assistance requirement with each of the plurality of predetermined assistance requirements and the identified context (primary and/or secondary) with each of the plurality of predetermined contexts. Thus, based on the comparing, the identified assistance requirement is categorized into the at least one predefined category, such that, the identified assistance requirement closely matches with assistance requirements mapped to the at least one predefined category.

Further, a sub-category may be assigned, by the AI model, to the identified assistance requirement at each of a plurality of structured category levels associated with the at least one predefined category, at step 606. In an embodiment, the plurality of structured category levels may be hierarchical. The sub-category may be assigned by comparing the identified context (primary and/or secondary) with the plurality of predetermined contexts. Further, the sub-category assigned at each of the plurality of structured category levels may be associated with one of the plurality of predetermined contexts. In other words, for a given assistance requirement, a parent category may be there. That parent predefined category may further have sub-categories at multiple structured levels, such that, a sub-category at a given structured level may correspond to a specific context. Thus, the parent category may correspond to the given assistance requirement, while the child categories or sub-categories may correspond to different contexts.

The process 600 may further include identifying a leaf category level from the plurality of structured category levels, at step 608. The leaf category level may be identified based on the assigned sub-category at each of the plurality of structured category levels. The leaf category level is the last sub-category level for the at least one predefined category. Each leaf category level is mapped to one or more intelligent assistive models. The process 600 may include extracting, at step 610, the at least one intelligent assistive model that is associated or mapped with the leaf category level identified at step 608. Thus, by traversing the plurality of structured category levels, the at least one intelligent assistive model is identified, which is then used to generate the at least one assistive conversation streams. In an alternate embodiment, each category level may be mapped with at least one intelligent assistive model. Thus, in this case, traversal to the leaf category level may not be required to identify the at least one intelligent assistive model.

In an alternate embodiment, after identifying the leaf category level, the process 600 may include extracting at least one assistive conversation template associated with the leaf category level. Thereafter, the process 600 may include populating the at least one assistive conversation template based on the identified context (primary and/or secondary) and the user profile of each of the at least one user to generate the at least one assistive conversation stream.

By way of an example, one or more keywords may be extracted from a real-time conversation taking place between two users. Using a content analyzing model, an assistance requirement may be determined based on the extracted one or more keywords. The assistance requirement, for example, may be 'booking' and context of the conversation, for example, may be 'booking for a doctor's visit' and 'pain in heart.' Based on the identified assistance requirement, and using an AI model, at least one intelligent assistive model may be identified. The intelligent assistive model may be identified by first identifying relevant parent category for the assistance requirement of 'Booking.' Thereafter, in order to identify a leaf category level to which the intelligent assistive model may be mapped, the identified context (primary and/or secondary) of the conversation is used by the AI model. The identified context may be segregated into keywords as 'Doctor,' 'Pain,' and 'heart.' It may be apparent that the parent category of "Booking" may have multiple first level sub-categories as travel, movie, restaurant, mechanic, and Doctor. Thus, based on the identified context, the first level sub-category of 'Doctor' may be identified. The first level sub-category of 'Doctor' may further include multiple second level sub-categories as neuro, general physician, heart, orthopedic, pulmonologist, or gynecologist. Thus, based on the identified context, the second level sub-category of 'heart', which is also the leaf category level in this example may be identified. Accordingly, the AI model may identify an intelligent assistive model configured or trained to provide assistance in case of heart problems in patients. The intelligent assistive model may generate an assistive conversation stream and may then interject the real-time conversation with the assistive conversation stream. The assistive conversation stream, for example, may include details of a nearby heart surgeon along with his/her availability and means to initiate a booking. By way of another example, the assistive conversation stream may include suggestion to immediately take an Aspirin®.

Figure 7:
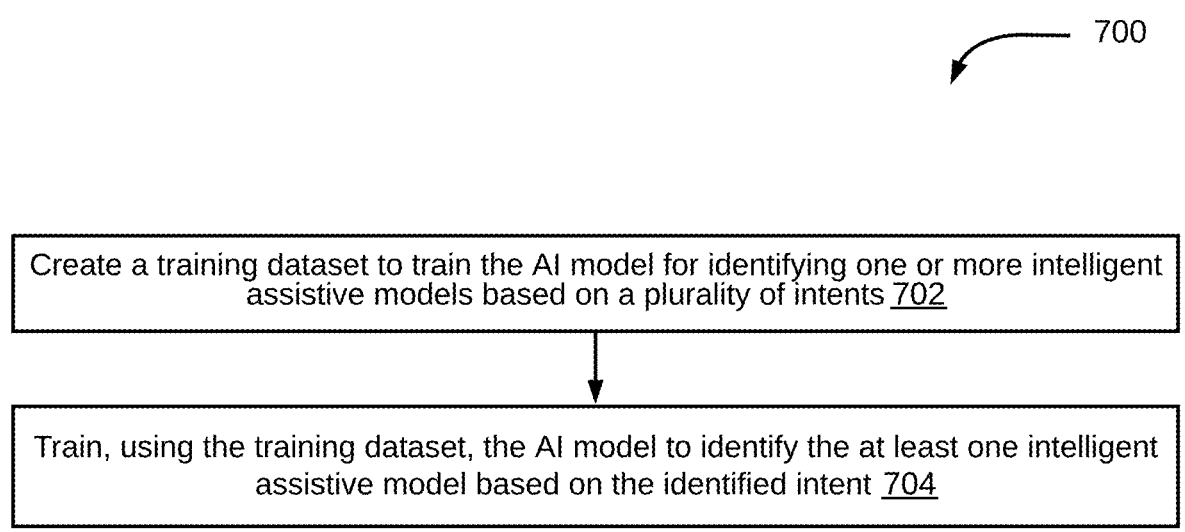
FIG. 7 illustrates an exemplary process for creating a training dataset to train an AI model for identifying an intelligent assistive model to generate at least one assistive conversation stream, in accordance with some embodiments.

Referring now to FIG. 7, an exemplary process for create a training dataset to train an AI model for identifying an intelligent assistive model to generate at least one assistive conversation stream is depicted via a flowchart, in accordance with some embodiments. The process 700 may create a training dataset to train the AI model for identifying one or more intelligent assistive models based on a plurality of assistance requirements, at step 702. Further, the process 700 may at step 704, use the training dataset to train the AI model to identify the at least one intelligent assistive model based on the identified assistance requirement. Thus, in this case, unlike the method described in FIG. 6, the AI model may directly be able to identify the at least one intelligent assistive model without traversing the plurality of structured category levels. In other words, based on the training the AI model may rely on statistics and keywords or a combination thereof to identify the at least one intelligent assistive model.

With reference to FIG. 8, generation of at least one assistive conversation stream by the AI based conversation assistant 200 is illustrated, in accordance with an exemplary embodiment. By way of an example, a user 802 (for example, a sales manager), individual users 804 and 806 (for example, sale personnel), and a team or a group of users 808 (for example, a foreign sales team) may all be virtually connected via a network 810 (for example, the Internet). Each of the users 802, 804, 806, and 808 may be involved in a real-time conversation, for example, an official meeting related to discussion about sales of an organization. As illustrated, the conversation assistant 200 may be installed on a computing device of the user 802. The conversation assistant 200 may capture at least one conversation stream that may include the keywords: 'increase,' 'sales target,' 'advertising budget,' 'sales pitch,' and so forth. The conversation assistant 200 may analyze the captured conversation stream to identify the assistance requirement as 'sales discussion' and the context as domestic sale, foreign sale, competitors, and so forth. Based on the identified assistance requirement and the context, an intelligent assistive model may be identified by the conversation assistant 200.

Thereafter, based on the identified assistance requirement, the identified context (primary and/or secondary), and a user profile of the user 802, just before the real-time conversation culminates, the intelligent assistive model may render a summary 810 of the whole real-time conversation. The summary 810 may include sales target figures, meeting notes and takeaways, meeting attendee's list, time, and date for next meeting to be scheduled and corresponding agenda, products, and competitors to be targeted, and so forth. The summary may be rendered to each of the users 802, 804, 806, and 808.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Thus, the disclosed method and system try to overcome the problem of using specific keywords to activate virtual personal assistants to perform one or more tasks being requested by the user. The method and system may provide an AI based automated conversation assistance for users participating in a real-time conversation. The disclosed method and system may identify an assistance requirement of the one or more users and a context (primary and/or secondary) of the real-time conversation to provide at least one assistive conversation stream. Further, the disclosed system and method enables the conversation assistant to join and interject a conversation automatically without being invoked by a signal or a keyword. The conversation assistant may provide assistance to the users on topics being discussed during the conversation or during a conference call on various domains, such as, sports, politics, science, news, weather, and so forth. Subsequently, the conversation assistant may reactively and/or proactively incorporate various pieces of advice, information, and feedback in the conversation. The advice, information, and the feedback may be privately provided to one of a user or publicly to all the users involved in the conversation.

As will be appreciated by those skilled in the art, the techniques described in the various embodiments discussed above are not routine, or conventional, or well understood in the art. The techniques discussed above may provide analyzing, using a content analyzing model, at least one conversation stream captured during a real-time conversation between a plurality of users. The at least one conversation stream may be associated with at least one user from the plurality of users. The technique may identify, using the content analyzing model, an assistance requirement of at least one first user of the at least one user and at least one context (primary and/or secondary) associated with the at least one conversation stream, based on the analysis of the at least one conversation stream. The technique may further, use an AI model to identify at least one intelligent assistive model based on the identified assistance requirement. The at least one intelligent assistive model may be configured or trained for the identified assistance requirement. The at least one intelligent assistive model may be identified based on a confidence score determined for the at least one intelligent assistive model relative to the identified assistance requirement. The technique may further use the at least one intelligent assistive model to generate at least one assistive conversation stream, based on one or more of: the identified assistance requirement, the identified primary context, the identified secondary context, and a user profile of each of the at least one user associated with the at least one conversation stream. Further, the technique may, contemporaneous to the at least one conversation stream being captured, render in real-time using the at least one intelligent assistive model, the at least one assistive conversation stream to the at least one first user.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for providing AI based automated conversation assistance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for assessing authenticity of a communication, the method comprising:
    analyzing, using a content analyzing model, content within at least one conversation stream captured during a real-time conversation between a plurality of users, wherein the at least one conversation stream is associated with at least one user from the plurality of users;
    identifying, using the content analyzing model, an assistance requirement of at least one first user of the at least one user and at least one primary context associated with the at least one conversation stream, based on the analysis of the content within the at least one conversation stream;
    identifying, using an AI model, at least one intelligent assistive model based on the identified assistance requirement, wherein the at least one intelligent assistive model is configured to provide assistance for the identified assistance requirement, and wherein the at least one intelligent assistive model is identified based on a confidence score determined for the at least one intelligent assistive model relative to the identified assistance requirement; wherein identifying the at least one intelligent assistive model comprises:
        categorizing, using the AI model, the identified assistance requirement into at least one predefined category from a plurality of predefined categories, wherein the categorization is performed by comparing the identified assistance requirement with a plurality of predetermined assistance requirements and the identified at least one primary context with a plurality of predetermined contexts, wherein the categorizing further comprises:
            assigning, by the AI model, a sub-category to the identified assistance requirement at each of a plurality of structured category levels associated with the at least one predefined category, by comparing the identified at least one primary context with the plurality of predetermined contexts, wherein the sub-category assigned at each of the plurality of structured category levels is associated with one of the plurality of predetermined contexts;
    generating, using the at least one intelligent assistive model, at least one assistive conversation stream, based on one or more of: the identified assistance requirement, the identified at least one primary context, a user profile of each of the at least one user associated with the at least one conversation stream, and additionally at least one secondary context; and
    contemporaneous to the at least one conversation stream being captured, rendering in real-time using the at least one intelligent assistive model, the at least one assistive conversation stream to the at least one first user.

2. The method of claim 1, further comprising capturing a plurality of conversation streams from the real-time conversation based on a predefined criterion, wherein the plurality of conversation streams comprise the at least one conversation stream.

3. The method of claim 2, wherein the predefined criterion comprises at least one of:
    expiry of a predefined time interval;
    utterance of one of a plurality of predefined keywords or phrases;
    a pause in the real-time conversation having a time duration greater than a predefined time limit; and
    identification of a partial intent from the real-time conversation.

4. The method of claim 1, wherein the at least one assistive conversation stream is rendered privately to the at least one first user.

5. The method of claim 1, wherein generating comprises modifying, the at least one assistive conversation stream, based on the user profile associated with each of the at least one user to generate at least one modified assistive conversation stream.

6. The method of claim 5, wherein rendering comprises rendering each of the at least one modified assistive conversation stream to an associated user from the at least one user.

7. The method of claim 1, wherein generating the at least one assistive conversation stream comprises identifying a leaf category level from the plurality of structured category levels, based on the assigned sub-category at each of the plurality of structured category levels.

8. The method of claim 7, wherein the at least one intelligent assistive model is associated with the identifying leaf category level.

9. The method of claim 7, further comprising extracting at least one assistive conversation template associated with the leaf category level.

10. The method of claim 9, further comprising populating the at least one assistive conversation template based on the identified at least one primary context, the at least one secondary context, and the user profile of each of the at least one user to generate the at least one assistive conversation stream.

11. The method of claim 1, further comprising:
creating a training dataset to train the AI model for identifying one or more intelligent assistive models based on a plurality of assistance requirements; and
training, using the training dataset, the AI model to identify the at least one intelligent assistive model based on the identified assistance requirement.

12. A system for providing Artificial Intelligence (AI) based automated conversation assistance, the system comprising:
a processor; and
a memory communicatively coupled to the processor, wherein the memory stores processor-executable instructions, which, on execution, causes the processor to:
analyze, using a content analyzing model, content within at least one conversation stream captured during a real-time conversation between a plurality of users, wherein the at least one conversation stream is associated with at least one user from the plurality of users;
identify, using the content analyzing model, an assistance requirement of at least one first user of the at least one user and at least one primary context associated with the at least one conversation stream, based on the analysis of the content within the at least one conversation stream;
identify, using an AI model, at least one intelligent assistive model based on the identified assistance requirement, wherein the at least one intelligent assistive model is configured to provide assistance for the identified assistance requirement, and wherein the at least one intelligent assistive model is identified based on a confidence score determined for the at least one intelligent assistive model relative to the identified assistance requirement, wherein identifying the at least one intelligent assistive model comprises:
categorizing, using the AI model, the identified assistance requirement into at least one predefined category from a plurality of predefined categories, wherein the categorization is performed by comparing the identified assistance requirement with a plurality of predetermined assistance requirements and the identified at least one primary context with a plurality of predetermined contexts, wherein the categorizing further comprises:
assigning, by the AI model, a sub-category to the identified assistance requirement at each of a plurality of structured category levels associated with the at least one predefined category, by comparing the identified at least one primary context with the plurality of predetermined contexts, wherein the sub-category assigned at each of the plurality of structured category levels is associated with one of the plurality of predetermined contexts;
generate, using the at least one intelligent assistive model, at least one assistive conversation stream, based on one or more of: the identified assistance requirement, the identified at least one primary context, at least one secondary context, and a user profile of each of the at least one user associated with the at least one conversation stream; and
contemporaneous to the at least one conversation stream being captured, render in real-time using the at least one intelligent assistive model, the at least one assistive conversation stream to the at least one first user.

13. The system of claim 12, wherein the processor-executable instructions further cause the processor to capture a plurality of conversation streams from the real-time conversation based on a predefined criterion, wherein the plurality of conversation streams comprise the at least one conversation stream.

14. The system of claim 13, wherein the predefined criterion comprises at least one of:
expiry of a predefined time interval;
utterance of one of a plurality of predefined keywords or phrases;
a pause in the real-time conversation having a time duration greater than a predefined time limit; and
identification of a partial intent from the real-time conversation.

15. The system of claim 12, wherein the at least one assistive conversation stream is rendered privately to the at least one first user.

16. The system of claim 12, wherein to generate the at least one assistive conversation stream comprises modifying, the at least one assistive conversation stream, based on the user profile associated with each of the at least one user to generate at least one modified assistive conversation stream.

17. The system of claim 16, wherein to render the at least one assistive conversation stream comprises rendering each of the at least one modified assistive conversation stream to an associated user from the at least one user.

18. The system of claim 12, wherein the processor-executable instructions further cause the processor to:
create a training dataset to train the AI model for identifying one or more intelligent assistive models based on a plurality of assistance requirements; and
train, using the training dataset, the AI model to identify the at least one intelligent assistive model based on the identified assistance requirement.

19. A computer program product being embodied in a non-transitory computer readable storage medium of a computing device and comprising computer instructions for:
analyzing, using a content analyzing model, content within at least one conversation stream captured during a real-time conversation between a plurality of users, wherein the at least one conversation stream is associated with at least one user from the plurality of users;
identifying, using the content analyzing model, an assistance requirement of at least one first user of the at least one user and at least one primary context associated with the at least one conversation stream, based on the analysis of the content within the at least one conversation stream;
identifying, using an AI model, at least one intelligent assistive model based on the identified assistance requirement, wherein the at least one intelligent assistive model is configured to provide assistance for the identified assistance requirement, and wherein the at least one intelligent assistive model is identified based on a confidence score determined for the at least one intelligent assistive model relative to the identified assistance requirement, wherein identifying the at least one intelligent assistive model comprises:
categorizing, using the AI model, the identified assistance requirement into at least one predefined category from a plurality of predefined categories, wherein the categorization is performed by comparing the identified assistance requirement with a plurality of predetermined assistance requirements and the identified at least one primary context with a plurality of predetermined contexts, wherein the categorizing further comprises:
assigning, by the AI model, a sub-category to the identified assistance requirement at each of a plurality of structured category levels associated with the at least one predefined category, by comparing the identified at least one primary context with the plurality of predetermined contexts, wherein the sub-category assigned at each of the plurality of structured category levels is associated with one of the plurality of predetermined contexts;
generating, using the at least one intelligent assistive model, at least one assistive conversation stream, based on one or more of: the identified assistance requirement, the identified at least one primary context, at least one secondary context, and a user profile of each of the at least one user associated with the at least one conversation stream; and contemporaneous to the at least one conversation stream being captured, rendering in real-time using the at least one intelligent assistive model, the at least one assistive conversation stream to the at least one first user.

* * * * *